(No Model.)
S. L. BLIGH.
CHEESE CUTTER.
No. 441,053. Patented Nov. 18, 1890.
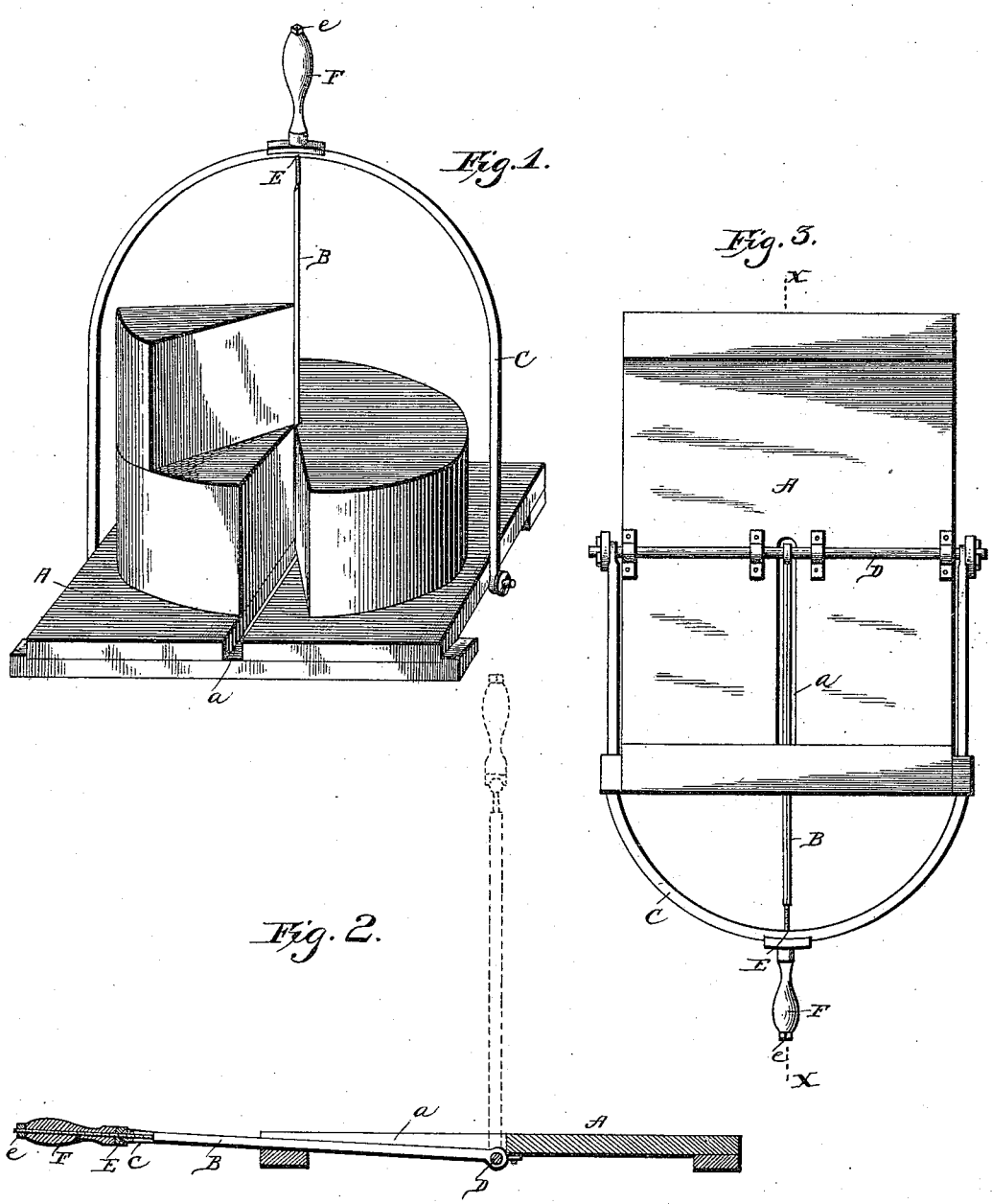
WITNESSES
F. L. Ourand
Van Buren Hillyard
INVENTOR
Samuel L. Bligh
By R. S. & A. P. Lacey
his Attorneys

United States Patent Office.

SAMUEL L. BLIGH, OF CUSTARD'S, PENNSYLVANIA.

CHEESE-CUTTER.

SPECIFICATION forming part of Letters Patent No. 441,053, dated November 18, 1890.

Application filed July 11, 1890. Serial No. 358,387. (No model.)

*To all whom it may concern:*

Be it known that I, SAMUEL L. BLIGH, a citizen of the United States, residing at Custard's, in the county of Crawford and State of Pennsylvania, have invented certain new and useful Improvements in Cheese-Cutters; and I do hereby declare the following to be a full, clear, and exact description of the invention, such as will enable others skilled in the art to which it appertains to make and use the same.

This invention relates to cheese-cutters, and aims to provide a simple and efficient means for cutting slices from a block of cheese in a rapid and convenient manner.

The improvement consists of the novel construction and combination of the parts which will be hereinafter more fully described and claimed, and which are shown in the annexed drawings, in which—

Figure 1 is a perspective view of a cheese-cutter embodying my invention, showing the application of the same. Fig. 2 is a cross-section on the line $x\ x$, Fig. 3, showing the operation of the same by dotted lines. Fig. 3 is a bottom plan view of the cutter.

The platform A, of wood or other suitable material, is provided with a slot or channel $a$, which is of sufficient depth to receive the knife or cutter B, which is pivoted at its inner or lower end to the platform at the inner end of the slot or channel $a$. The arched frame C is pivoted at its lower end to the sides of the platform in such a manner that the pivotal points of the knife and frame with the platform will be in the same straight line, the pivotal connections being effected in a simple manner by the rod D, which passes beneath the platform and is held thereto in any suitable manner, and through coincident openings in the lower ends of the knife and frame C. The upper end of the knife B is connected with a coupling E, which passes through an opening in the top part of the arched frame C. The upper end of the coupling is threaded to receive the nut $e$, by means of which tension is obtained on the knife B. The handle F is in line with the knife, and is secured to the upper end of the coupling E. The knife is double-edged and cuts both ways.

The application of the invention is as follows: The cheese is placed on the platform with its center directly over the lower pivotal point of the knife, the latter being previously turned down to lie in the channel $a$. A tubular cutter or other suitable instrument is forced down from above through the center of the cheese, removing a portion thereof, so as to leave a central opening in the cheese. The free end of the frame is elevated to the perpendicular, thereby cutting through the cheese from the lower side. The cheese is now turned to the right or the left the required distance and the free end of the frame is carried to the horizontal, cutting a slice from the cheese. The knife being double-edged cuts in both directions. When the frame is turned to the horizontal, the knife will lie in the channel $a$ and be out of the way, so as not to interfere with the free turning of the cheese. The cheese can also readily be turned round the knife when in perpendicular position.

Having thus described my invention, what I claim, and desire to secure by Letters Patent, is—

1. A cheese-cutter comprising a platform having the groove or channel $a$, the arched frame C, the cutter B, adjustably connected at its upper end with the arched frame, and the rod D beneath the platform passed through openings in the free ends of the arched frame B and through the opening in the lower end of the cutter to form the pivotal connection between the platform and the said arched frame and cutter, substantially as described.

2. The hereinbefore shown and described cheese-cutter, composed of platform A, having groove or channel $a$, the rod D beneath the platform, the arched frame having its ends mounted on the rod D, the double-edge cutter having its lower end mounted on rod D and having its upper end threaded and passed through the arched frame and the handle mounted on the said threaded end $f$, the cutter, and nut $e$ for obtaining a tension on the said cutter, substantially as described.

In testimony whereof I affix my signature in presence of two witnesses.

SAMUEL L. BLIGH.

Witnesses:
A. K. CARMICHAEL,
MILES W. TATE.